(12) United States Patent
Hu et al.

(10) Patent No.: US 11,220,147 B2
(45) Date of Patent: *Jan. 11, 2022

(54) REAR SWING ARM SUSPENSION

(71) Applicant: Zhejiang CFMOTO Power Co., Ltd., Zhejiang (CN)

(72) Inventors: Xiayang Hu, Hangzhou (CN); Meilin Feng, Hangzhou (CN)

(73) Assignee: Zhejiang CFMOTO Power Co., Ltd., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,909

(22) Filed: Jul. 24, 2020

(65) Prior Publication Data

US 2020/0353784 A1    Nov. 12, 2020

Related U.S. Application Data

(62) Division of application No. 15/825,662, filed on Nov. 29, 2017, now Pat. No. 10,723,190.

(30) Foreign Application Priority Data

Nov. 29, 2016 (CN) .......................... 201611075332.1
Nov. 29, 2016 (CN) .......................... 201611078583.5

(51) Int. Cl.
  *B60G 3/20*    (2006.01)
  *B60G 7/02*    (2006.01)
  (Continued)

(52) U.S. Cl.
  CPC .............. *B60G 3/202* (2013.01); *B60G 7/008* (2013.01); *B60G 21/055* (2013.01);
  (Continued)

(58) Field of Classification Search
  CPC .......... B60G 3/22; B60G 3/202; B60G 3/205; B60G 7/008; B60G 2204/148; B60G 2300/07; B60G 2300/124; B60G 2200/184; B60G 2200/182; B60G 2200/462; B60G 2200/46
  (Continued)

(56) References Cited

U.S. PATENT DOCUMENTS 3,149,690 A    9/1964 Rosenkrands et al.
4,511,160 A    4/1985 Inoue
(Continued)

FOREIGN PATENT DOCUMENTS

EP    0899133 A2 *  3/1999    ............. B60G 7/001

*Primary Examiner* — Keith J Frisby
(74) *Attorney, Agent, or Firm* — Shewchuk IP Services, LLC; Jeffrey D. Shewchuk

(57) ABSTRACT

A swing arm type suspension for a rear wheel of an off road vehicle can use two or three tie rods to control toe-in of the knuckle. The rear end of the swing arm is split between an upper clamping arm and a lower clamping arm defining an eye, with the knuckle connected to the upper and lower clamping arms by joint bearings, and with either the transmission shaft or one of the tie rods extending through the eye of the swing arm to the knuckle. The front of the swing arm can be connected to the vehicle frame using a cross-shaft joint. Camber, toe-in and half-track width are controlled to result in a smaller turning radius with better ride characteristics.

20 Claims, 5 Drawing Sheets

(51) Int. Cl.
    *B60G 7/00*        (2006.01)
    *B60G 21/055*      (2006.01)

(52) U.S. Cl.
    CPC .... *B60G 2200/182* (2013.01); *B60G 2200/46* (2013.01); *B60G 2200/462* (2013.01); *B60G 2204/148* (2013.01); *B60G 2206/50* (2013.01); *B60G 2300/07* (2013.01)

(58) Field of Classification Search
    USPC .................................................. 280/124.128
    See application file for complete search history.

(56) References Cited

U.S. PATENT DOCUMENTS

| | | | |
|---|---|---|---|
| 4,696,488 A | 9/1987 | Mitobe et al. | |
| 4,832,363 A | 5/1989 | Mitobe | |
| 4,840,396 A * | 6/1989 | Kubo | B60G 3/202 |
| | | | 280/124.143 |
| 4,986,567 A | 1/1991 | Kubo et al. | |
| 4,989,894 A | 2/1991 | Winsor et al. | |
| 5,009,449 A | 4/1991 | Edahiro et al. | |
| 6,851,691 B2 | 2/2005 | Rasidescu et al. | |
| 6,945,547 B2 * | 9/2005 | Ackley | B60G 3/18 |
| | | | 280/124.143 |
| 7,014,201 B2 * | 3/2006 | Lee | B60G 7/001 |
| | | | 280/124.128 |
| 7,401,797 B2 | 7/2008 | Cho | |
| 8,746,719 B2 | 6/2014 | Safranski et al. | |
| 9,365,251 B2 | 6/2016 | Safranski et al. | |
| 9,446,642 B2 | 9/2016 | Stenzenberger et al. | |
| 10,464,386 B2 * | 11/2019 | Hisada | B60G 3/202 |
| 2007/0007741 A1 | 1/2007 | Jargowsky et al. | |
| 2014/0103627 A1 | 4/2014 | Deckard et al. | |
| 2016/0347137 A1 | 12/2016 | Despres-Nadeau et al. | |
| 2017/0080977 A1 | 3/2017 | Schroeder et al. | |
| 2018/0264902 A1 * | 9/2018 | Schroeder | B60G 7/02 |

* cited by examiner

REAR SWING ARM SUSPENSION

CROSS-REFERENCE TO RELATED U.S. APPLICATION(S)

This is a divisional of U.S. patent application Ser. No. 15/825,662, filed Nov. 29, 2017, which issued Jul. 28, 2020 as U.S. Pat. No. 10,723,190. The contents of U.S. patent application Ser. No. 15/825,662 are incorporated by reference.

FIELD OF THE INVENTION

The present invention relates to suspension systems in vehicles, and particularly to rear suspensions of the swing arm suspension type, which can be used in offroad vehicles such as UVs and ATVs.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement. In general, such UVs and ATVs have a lower price point and are considerably smaller and simpler than on-road vehicles such as passenger automobiles and trucks.

One type of rear suspension known for use on UVs and ATVs may be referred to as a swing axle or swing arm suspension, in which a primary swing arm supporting the rear wheel extends longitudinally forward from the hub of the rear wheel, with the forward pivot point for the primary swing arm located in front of the rear wheel. Examples of swing arm suspensions, including their use on UVs and ATVs, are disclosed in U.S. Pat. Nos. 3,149,690, 6,851,691, 7,401,797, 8,746,719 and 9,365,251, incorporated by reference. Such rear swing arm suspensions can lead to a longer permissible travel distance of the shock absorber than traditional suspensions. However, the structures of such rear swing arm suspensions are complicated and expensive, and also result in a large turning radius of the vehicle, making it inconvenient and uncomfortable to drive the vehicle. Better solutions are needed.

BRIEF SUMMARY OF THE INVENTION

The present invention is a swing arm type suspension for a rear wheel of an off road vehicle. In one aspect, the tie rods supporting the knuckle for the rear wheel are connected at locations significantly in front of and behind the rotational axis of the rear wheel, so while wheel elevation is primarily controlled by pivoting of the swing arm, toe-in is controlled by the tie rods. In another aspect, the rear end of the swing arm is split between an upper clamping arm and a lower clamping arm defining an eye, with the knuckle connected to the upper and lower clamping arms by joint bearings, and with either the transmission shaft or one of the tie rods extending through the eye of the swing arm to the knuckle. In another aspect, the front of the swing arm is connected to the vehicle frame using a cross-shaft joint, and extension of the suspension significantly decreases half-track width but compression of the suspension does not significantly affect half-track width. Overall, camber, toe in and track width changes are precisely controlled to result in a reduced turning radius for the vehicle while at the same time improving the comfort of the all-terrain vehicle, using a suspension structure which is reasonable in cost, reasonable is size relative to other components of the vehicle, and reasonable in weight contributed to the vehicle.

Figure 1:
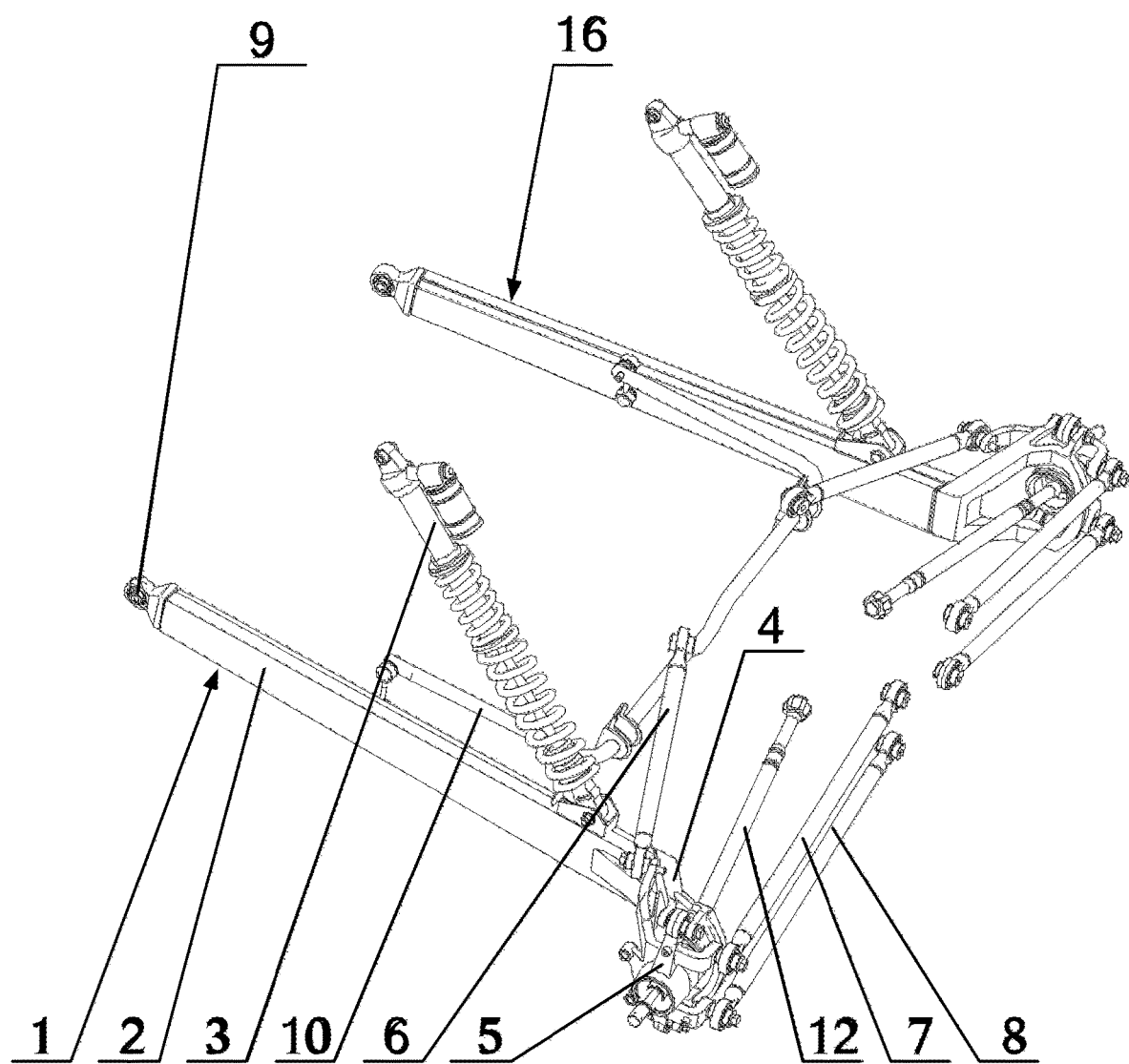
FIG. 1 is a perspective view showing a first embodiment of a rear suspension assembly of the present invention.

In these drawings, the reference numerals are as follows:
the left rear suspension 1,
the swing arm 2,
the damping device 3,
the mounting base 4 for the knuckle,
the knuckle 5,
the first tie-rod 6,
the second tie-rod 7,
the third tie-rod 8,
the joint bearing 9,
the stabilizer rod 10,
the upper clamping arm 11,
the transmission shaft 12,
the first mounting arm 13,
the second mounting arm 14,
the third mounting arm 15,
the right rear suspension 16,
the connecting rod 17,
the lower clamping arm 18
the cross shaft joint 19, and
wheel 20.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The rear suspension assembly includes a left rear suspension 1 and a right rear suspension 16, which are preferably symmetrical with respect to each other as well as symmetrically mounted on to the frame of the all-terrain vehicle, utility vehicle, or other similar vehicle intended to be driven off-pavement. The weight of the vehicle is primarily bourn by the swing arm 2, which extends longitudinally on the vehicle between a front attachment joint bearing 9 and a knuckle 5. The joint bearing 9 allows both full pivoting about a substantially horizontal, transversely extending axis as well as a limited amount of pivoting about a substantially vertical axis, so the rearward end of the swing arm can move not only up and down but also inward and outward. As used herein, the term "joint bearing" refers to a joint that allows at least a limited amount of articulated pivoting motion in more than one plane, such as a tie rod end bearing (also known as a helm joint or a rose joint). The preferred joint bearings include a partly-spherical portion of the pivot pin received in a partly-spherical recess in the eye of the end of the swing arm or tie rod.

The knuckle 5 is equipped with a rim bearing, and the wheel hub (not shown) is rotationally mounted on the knuckle 5. The orientation and elevation of the knuckle 5 with respect to the frame thus determines the orientation and elevation of the wheel 20 with respect to the vehicle. The damping device or shock absorber 3 provides both a spring force and a hydraulic damping dashpot on the primary pivoting motion of the swing arm 2. The trailing end of the swing arm 2 includes an upper clamping arm 11 spaced from a lower clamping arm 18. The upper end of the knuckle 5 is connected to the upper clamping arm 11 by one joint bearing which allows pivoting about both a substantially horizontal, longitudinally extending axis and (to a limited degree) about a substantially vertical axis, and the lower end of the knuckle 5 is connected to the lower clamping arm 18 by another joint bearing which allows pivoting about a substantially horizontal, longitudinally extending axis and (to a more limited degree) about a substantially vertical axis.

In the preferred embodiments, the rear wheel 20 is a driven wheel. The driving force of the wheel 20 is provided by a transmission shaft 12, with its outer end at an elevation between the upper clamping arm 11 and the lower clamping arm 18. The transmission shaft 12 preferably includes a constant velocity joint, interior to the knuckle 5, which allows it to articulate at any position of the suspension while it transfers torque to the wheel 20.

The swing arms 2 of the left rear suspension 1 and the right rear suspension 16 are preferably joined by a stabilizer bar or sway bar 10. As known in the art, the stabilizer bar 10 acts as a torsion spring to transfer motion between the left and right rear suspensions, tending to counteract against leaning of the vehicle in turns.

In addition to the pivoting of the swing arm 2, the suspension movement of the knuckle 5 is determined and constrained by the first tie-rod 6, the second tie-rod 7 and optionally the third tie-rod 8. The knuckle 5 includes a first mounting arm 13 arranged at the front side of the knuckle 5, and the first tie rod 6 connects in to the first mounting arm 13. In the embodiment shown in FIGS. 1 and 2, the first mounting arm 13 is at a first preferred elevation which is higher than the driving end of the transmission shaft 12, and above the upper clamping arm 11. The connection between the first tie rod 6 and the first mounting arm 13 is preferably via a joint bearing. In the embodiment shown in FIGS. 3 and 4, the first mounting arm 13 is at a second preferred elevation which is roughly the same elevation as the driving end of the transmission shaft 12, and between the upper clamping arm 1 and the lower clamping arm 18. A third embodiment (not shown), positions the first mounting arm at a lower front elevation, below the driving end of the transmission shaft 12, and under the lower clamping arm 18.

The knuckle 5 includes a second mounting arm 14 arranged at the rear side of the knuckle 5, and the second tie rod 7 connects in to the second mounting arm 14. In the embodiment shown in FIGS. 1 and 2, the second mounting arm 14 is at a preferred elevation which is higher than the driving end of the transmission shaft 12, and roughly the same elevation as the upper clamping arm 11. The connection between the second tie rod 7 and the second mounting arm 14 is preferably via a joint bearing. In the embodiment shown in FIGS. 3 and 4, the second mounting arm 13 is at roughly the same elevation as the driving end of the transmission shaft 12, and between the upper clamping arm 1 and the lower clamping arm 18.

Figure 2:
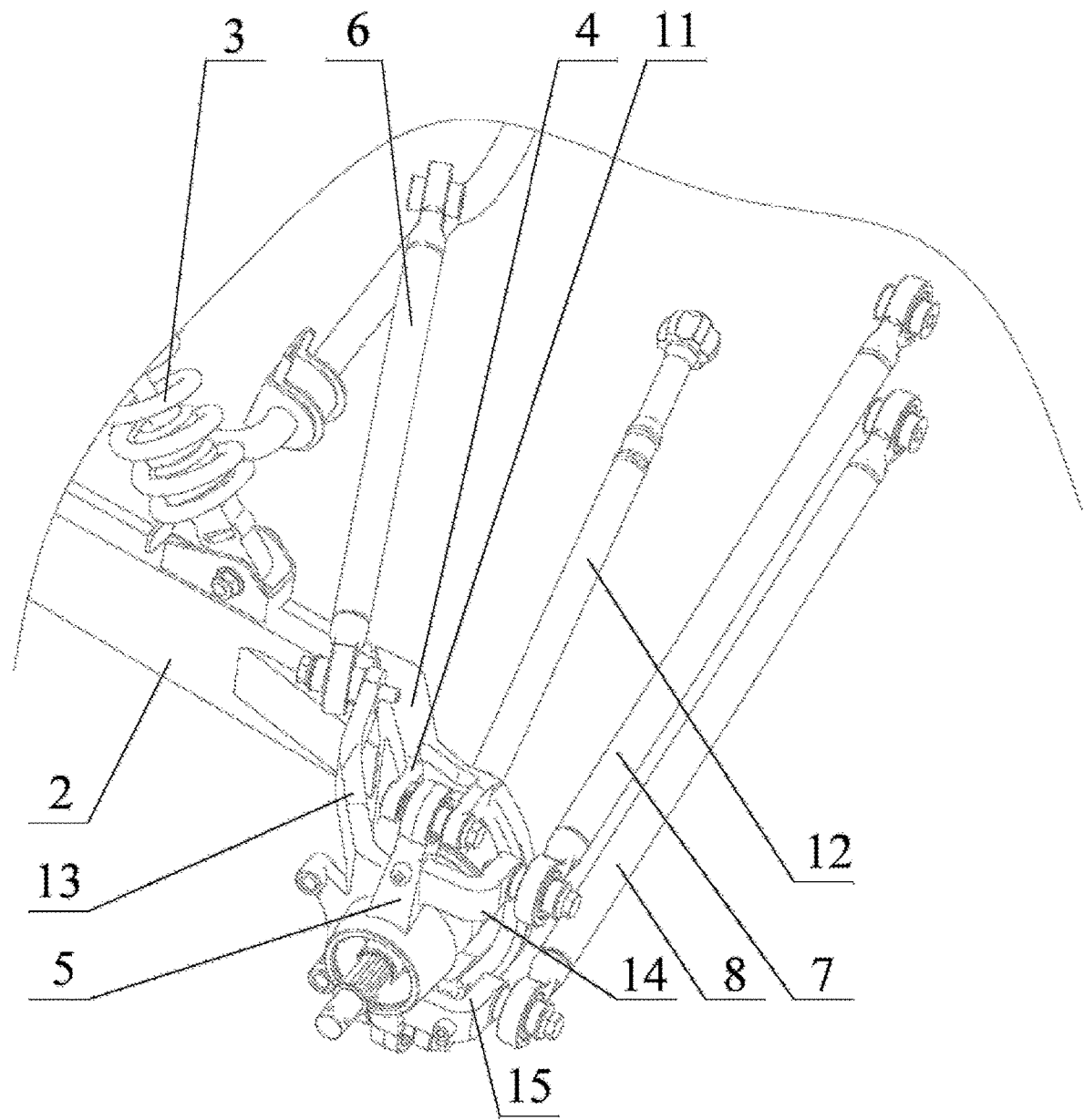
FIG. 2 is an enlargement of a portion of FIG. 1.

In the embodiment shown in FIGS. 1 and 2, the optional third mounting arm 15 is arranged at the lower rear side of the knuckle 5 and extends behind the mounting base 4 for the left rear knuckle 5. The optional third tie rod 8 connects in to the third mounting arm 15. In the embodiment shown in FIGS. 1 and 2, the third mounting arm 15 is at a preferred elevation which is lower than the driving end of the transmission shaft 12, and roughly the same elevation as the lower clamping arm 18. The connection between the third tie rod 8 and the third mounting arm 15 is preferably via a joint bearing. The axes of the joint bearings of the first tie-rod 6, the second tie-rod 7 and the third tie-rod 8 are generally horizontal and perpendicular to the length of the respective tie rod. In the preferred embodiments, the first mounting arm 13, the second mounting arm 14 and the third mounting arm 15 are all the bent plates welded to the knuckle 5.

Figure 3:
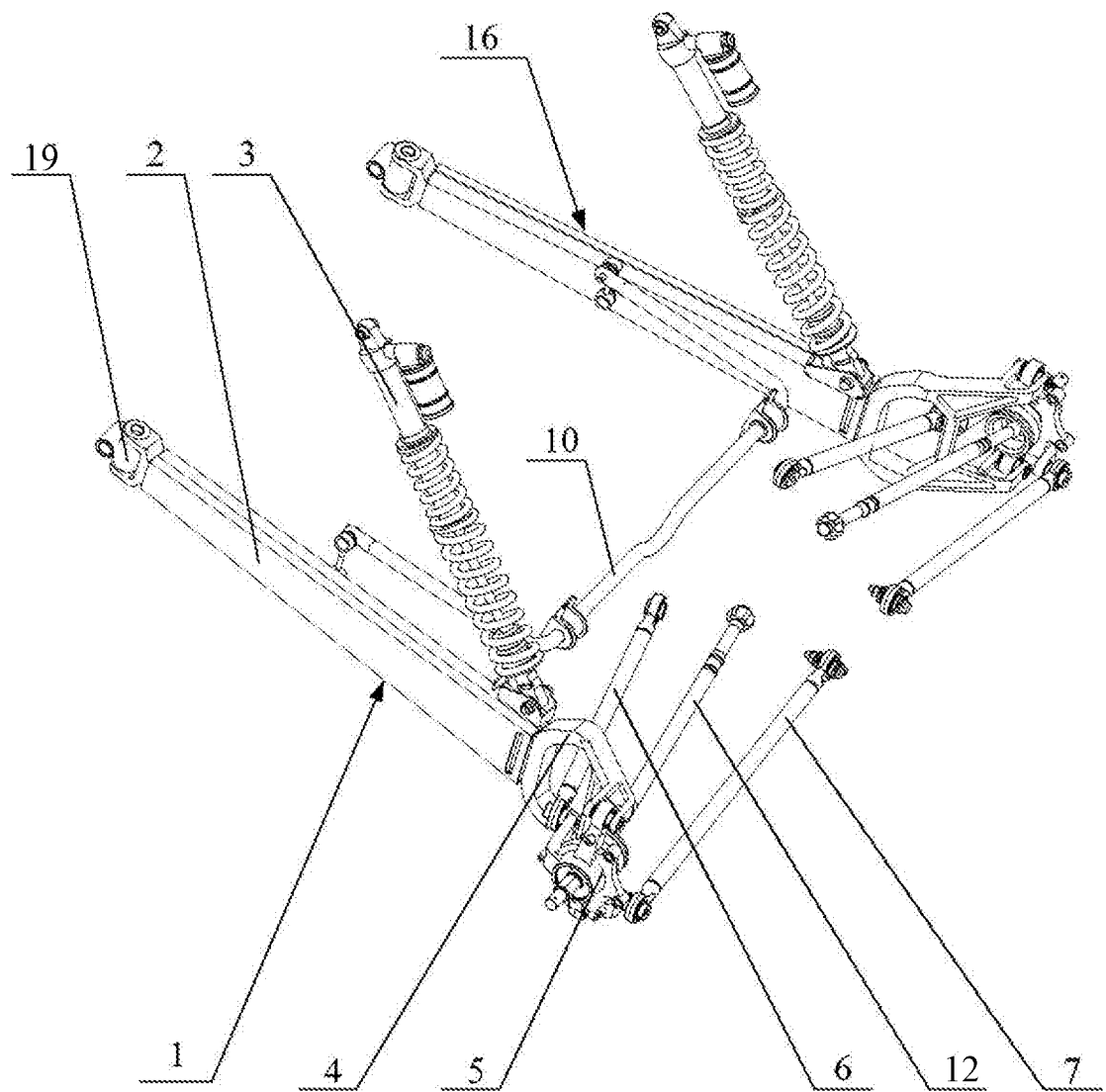
FIG. 3 is a perspective view showing a second embodiment of a rear suspension assembly of the present invention.
Figure 4:
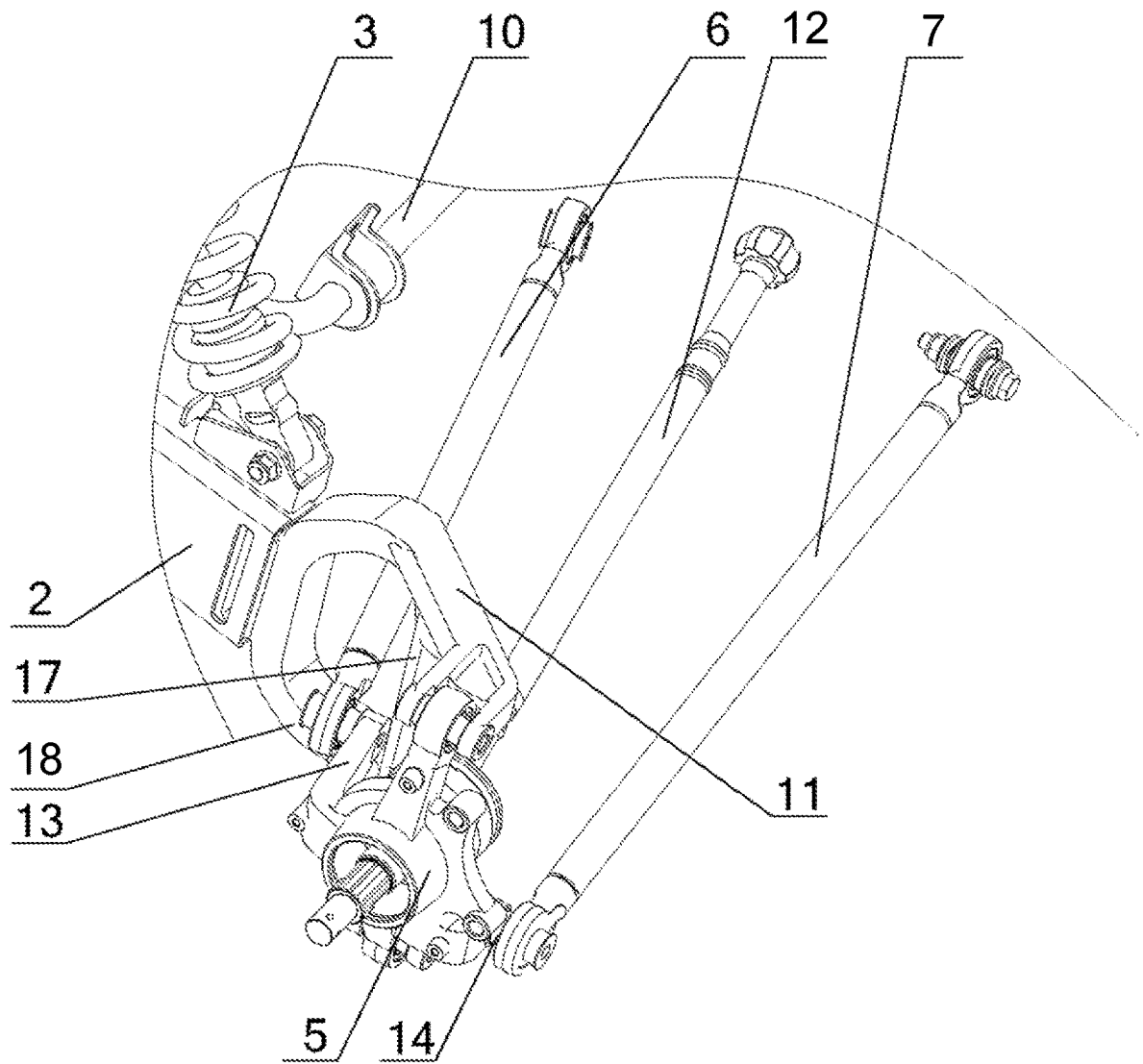
FIG. 4 is an enlargement of a portion of FIG. 3.

In the embodiment of FIGS. 3 and 4, the joint bearing 9 is replaced with a cross-shaft joint 19. The cross-shaft joint 19 allows both full pivoting about a substantially horizontal, transversely extending axis and full pivoting about a substantially vertical axis. However, the cross-shaft joint 19 resists any rotation about the longitudinal axis of the swing arm 2, thus tending to minimize any change in camber angle of the wheel 20. In contrast, in the embodiment of FIGS. 1 and 2, the camber angle of the wheel 20 is controlled by having the tie rods 6, 7, 8 and the respective mounting arms 13, 14, 15 at different elevations. Tie rod 8 and its mounting arm 15 is particularly at a different elevation below tie rod 7 and its mounting arm 14, with this different elevation providing sufficient forces to control camber angle. Accordingly, the use of the cross-shaft joint 19 is particularly appropriate for embodiments which use only two tie rods, both connecting to the knuckle 5 at generally the same elevation.

In both of these preferred embodiments, the trailing end of the swing arm 2, including the mounting base 4, the upper clamping arm 11, the connecting rod 17 and the lower clamping arm 18, is preferably rigidly formed of bent sheet or plate metal, arranged to define a large eye. In the embodiment of FIGS. 1 and 2, the transmission shaft 12 extends through the eye defined in the trailing end of the swing arm 2, whereas in the embodiment of FIGS. 3 and 4, the first tie rod 6 extends through the eye defined in the trailing end of the swing arm 2. In both situations, providing an eye in the trailing end of the swing arm 2 serves to receive a rod or shaft therethrough in a tighter and more beneficial arrangement than in the prior art. Forming the trailing end of the swing arm 2 out of sheet metal or plate metal allows the swing arm 2 to be formed at less expense than a curved, cast part which exists in many prior art suspensions. Formed by bent sheet or plate metal, the structural strength of the trailing end of the swing arm 2 is quite high at a modest weight.

In both of these preferred embodiments, there is one tie rod 6 which connects into the knuckle 5 significantly in front of the transmission shaft 12 (i.e., significantly in front of the wheel hub axis), and at least one other tie rod 7 and/or 8 which connects into the knuckle 5 significantly behind the transmission shaft 12 (i.e., significantly behind the wheel hub axis). Accordingly, the tie rods 6, 7, and 8 can be used to control toe-in in ways that cannot be achieved with the prior art swing arm suspensions.

In both of these preferred embodiments, the vertical separation between the upper clamping arm 11 and the lower clamping arm 18 allows the knuckle 5 to connect to the swing arm 2 at locations both significantly above and significantly below the transmission shaft 12 (i.e., significantly above and significantly below the wheel hub axis). This provides greater camber angle control and stability than achieved with prior art swing arm suspensions. At the same time, the existence of the connecting rod 17 or other closure of the eye provides greater strength and stability, as compared to separately cantilevered arms on the rearward end of the swing arm for both upper and lower attachments of the knuckle to the swing arm.

In both of these preferred embodiments, the space for mounting the shock absorber 3 has been made larger due to the locations of the tie rods 6-8, and thus the travel length of the shock absorber 3 is extended relative to prior art swing arm suspensions. To further increase the travel length of the shock absorber 3, the location where the shock absorber 3 attaches to the swing arm 2 is immediately adjacent and just in front of the separation of the swing arm 2 into the upper clamping arm 11 and the lower clamping arm 18. This positions the attachment point of the shock absorber 3 to the swing arm 2 significantly rearward as compared to many prior art swing arm suspensions.

At the same time as achieving all the above-listed benefits, the structure of the suspension plays a role of automatic control of track width, camber angle and toe in angle of the rear wheel 20, best understood with regard to FIG. 5 and Table I below. Specifically, during operation of the ATV or UV vehicle, the rear suspension allows the rear wheels to move between the middle, steady state position shown in solid lines (i.e., the position when the vehicle is stationary on level ground, and the suspension is merely compressed by vehicle weight) to the extended position shown in short dashed lines and/or to the compressed position shown in longer dashed lines. Table I shows the half track width, camber angle, toe-in and toe-in angle of the preferred suspension of FIGS. 3 and 4 based on the elevation and shock absorber length.

TABLE I

| Position | Elevation (mm) | Shock absorber length l (mm) | Half track width htw (mm to vehicle center line) | Camber angle θ (°) | Toe-In (mm) | Toe-In angle (°) |
|---|---|---|---|---|---|---|
| a (fully compressed) | 245 | 475 | 650 | 0.4 | 54 | 8 |
| b | 192 | 508 | 660 | 0.2 | 34 | 5 |
| c | 146 | 538 | 665 | 0.1 | 18 | 3 |
| d | 97 | 568 | 665 | 0 | 7 | 1 |
| e | 49 | 598 | 660 | −0.1 | 1 | 0 |
| f (steady state) | 0 | 630 | 650 | −0.2 | 0 | 0 |
| g | −49 | 658 | 635 | −0.1 | −3 | 0 |
| h | −96 | 688 | 615 | −0.1 | −2 | 0 |
| i (fully extended) | −140 | 715 | 588 | 0.2 | −5 | −1 |

Figure 5:
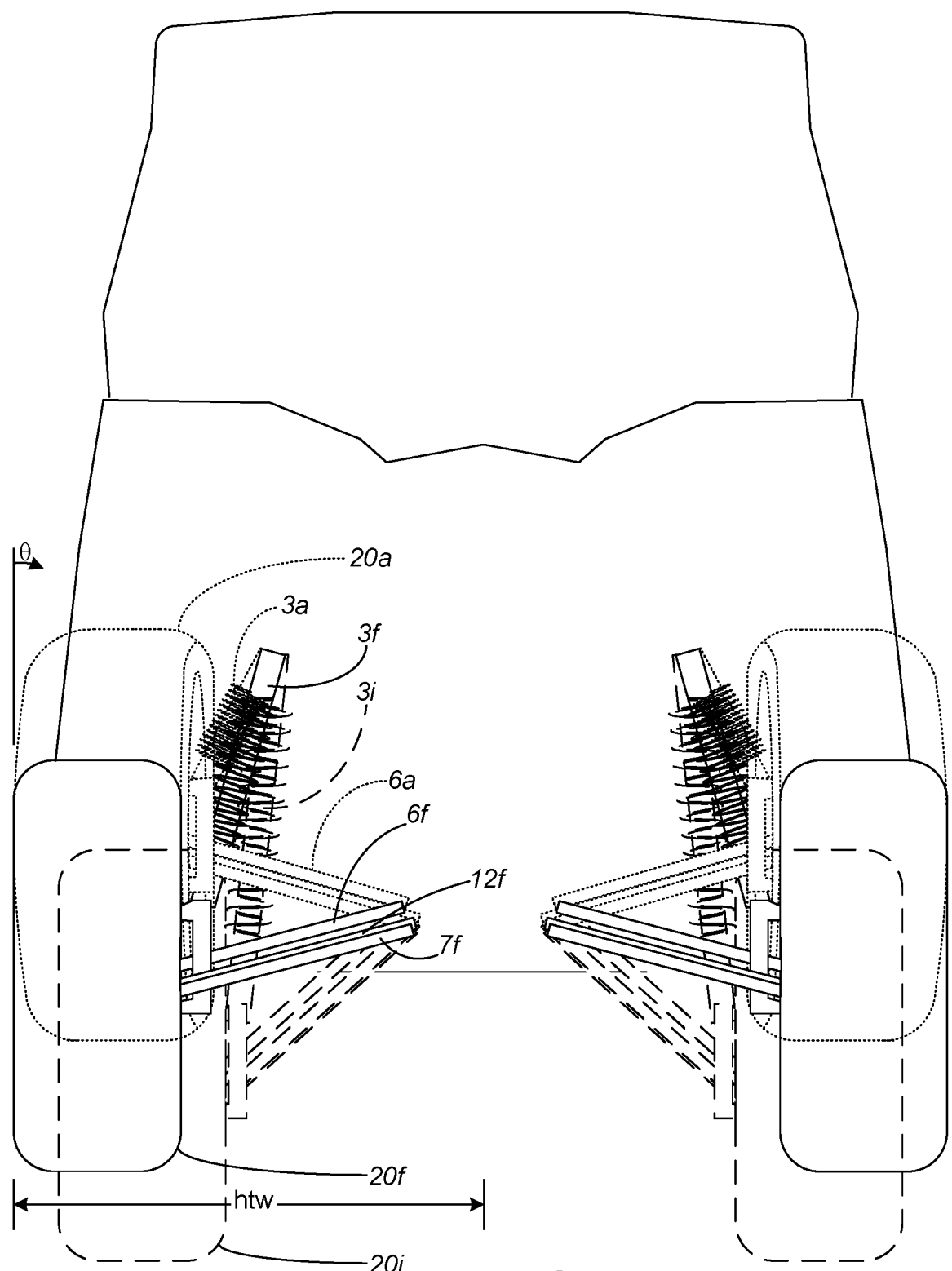
FIG. 5 is a rear view schematically showing the permissible suspension movement of the preferred rear suspension assembly of FIGS. 3 and 4.

FIG. 5 schematically depicts the locations of the major components on a rear view only for positions a, f, and i, with the other positions omitted for clarity.

Obviously, these specific values can change based on other parameters of vehicle design, such as vehicle size and weight, shock absorber selection, length of the various tie rods, etc. However, significant aspects of the preferred embodiments, which may or may not be required in the specific invention as claimed, include the following:

A. The total elevational difference between fully compressed and fully extended (385 mm) is quite high, particularly for the size of the suspension, and the corresponding size of the vehicle. This allows the off road vehicle to handle significant obstacles, such as traversing over logs and rocky terrain.

B. The shock absorber travel distance from fully extended to fully compressed (240 mm) is also significantly high, while leaving the shock absorber 3 at a convenient location on the vehicle so as to not interfere with other components.

C. The half track width remains fairly constant (i.e., changes <3% at any compressed location, and more preferably <1% at the fully compressed location) from the steady state position to the fully compressed position, but changes significantly (i.e., changes >3%, and more preferably >5%, and most preferably about 9.5%) from the steady state position to the fully extended position. Note the effect that this changing half track width when cornering if/when the vehicle suspension is not symmetrical during the turn (such as when cornering on flat terrain, causing the vehicle to load the outer rear wheel suspension while unloading the inner rear wheel suspension). For instance, if the outer rear wheel is loaded to position e and the inner rear wheel is unloaded to position g when going around a corner at a relatively slow speed with a relatively modest outward lean to the vehicle, the total track width changes from 650+650=1300 mm (even, travelling straight) to 660+635=1295 mm (leaning due to turning), i.e., a slight reduction in total rear track width. The more the vehicle leans outward (such as if the vehicle is travelling faster for the same corner), the greater reduction in total rear track width. The high reduction in half track width as the suspension is extended, coupled with a much smaller or negligible increase in half track width as the suspension is compressed, leads to more enjoyable recreational handling of the vehicle and a smaller turn radius.

D. The toe-in remains modest for light loading or unloading of the suspension, but becomes significant for heavy loading of the suspension. For instance, positions d through i all have a toe-in of less than 7 mm (±about 1° from the steady state position), whereas the heavily loaded positions a-c have significant (greater than 2°, and most preferably with a fully compressed toe-in greater than 5°). Again this benefit should be considered for heavy loading of the outer rear wheel when cornering, increasing the toe-in of the outer rear wheel and resulting in a smaller turn radius when cornering at speed.

E. The camber angle change, between any two suspension positions (preferably less than 2° between any two selected positions, and more preferably less than 1° between any two selected positions), is fairly small. The camber angle change, between any suspension position and the steady state position (preferably less than 1°, and more preferably about 0.5° or less), is similarly fairly small.

Overall, the importance of the precise control to the camber, toe in and track width changes provided by the preferred suspension is that it results in a reduced turning radius for the vehicle while at the same time improving the comfort of the all-terrain vehicle. All of these benefits are achieved with a suspension structure which is reasonable in cost, reasonable is size relative to other components of the vehicle, and reasonable in weight contributed to the vehicle.

Although the present invention has been described with reference to preferred embodiments, workers skilled in the art will recognize that changes may be made in form and detail without departing from the spirit and scope of the invention.

The invention claimed is:

1. A swing arm suspension for a rear wheel of an off road vehicle, comprising:
   a knuckle for supporting a rotational hub of a rear wheel, orientation of the knuckle controlling camber and toe-in of the rear wheel;
   a swing arm extending generally longitudinally on the vehicle, supporting the knuckle at its rear end and secured to a vehicle frame at its front end by a pivot joint permitting suspension travel of the knuckle, wherein the pivot joint of the swing arm comprises a cross-shaft joint for connecting the front end of the swing arm to the vehicle frame, the cross shaft joint allowing full pivoting about a substantially horizontal, transversely extending axis and separately allowing full pivoting about a substantially vertical axis, while substantially resisting rotation of the swing arm about a swing arm longitudinal axis which could otherwise result in camber change;
   a shock absorber connected between a rear portion of the swing arm and the vehicle frame, for dampening suspension motion; and
   a plurality of tie rods connected between the vehicle frame and the knuckle, at least one of the tie rods being connected to the knuckle at a location significantly in front of a rotational axis of the rear wheel, at least one of the tie rods being connected to the knuckle at a location significantly behind the rotational axis of the rear wheel, so the tie rods control toe-in of the rear wheel in a manner that toe-in changes as a function of suspension position.

2. The swing arm suspension of claim 1, wherein the rear end of the swing arm comprises an upper clamping arm spaced from a lower clamping arm, the knuckle connected to the upper clamping arm by a first joint bearing, the knuckle connected to the lower clamping arm by a second joint bearing.

3. The swing arm suspension of claim 2, wherein the upper clamping arm and lower clamping arm are joined by a connection rod to form an eye.

4. The swing arm suspension of claim 3, further comprising a transmission shaft for supplying torque for driving the rear wheel, wherein the transmission shaft extends through the eye.

5. The swing arm suspension of claim 3, wherein the rear end of the swing arm is formed by bent plate or sheet metal.

6. The swing arm suspension of claim 2, wherein the shock absorber connects to the swing arm immediately adjacent and in front of the upper clamping arm.

7. The swing arm suspension of claim 1, wherein each of the swing arm and each of the plurality of tie rods are connected to the vehicle frame with a joint bearing.

8. A swing arm suspension for a rear wheel of an offroad vehicle, comprising:
   a knuckle for supporting a rotational hub of a rear wheel, orientation of the knuckle controlling camber and toe-in of the rear wheel;
   a swing arm extending generally longitudinally on the vehicle, supporting the knuckle at its rear end and secured to a vehicle frame at its front end by a pivot joint permitting suspension travel of the knuckle, wherein the rear end of the swing arm comprises an upper clamping arm spaced from a lower clamping arm, the upper clamping arm and the lower clamping arm being joined by a connection rod to form an eye;
   a shock absorber connected between a rear portion of the swing arm and the vehicle frame, for dampening suspension motion; and
   a plurality of tie rods connected between the vehicle frame and the knuckle, at least one of the tie rods being connected to the knuckle at a location significantly in front of a rotational axis of the rear wheel, at least one of the tie rods being connected to the knuckle at a location significantly behind the rotational axis of the rear wheel, so the tie rods control toe-in of the rear wheel in a manner that toe-in changes as a function of suspension position, wherein one of the tie rods extends through the eye to connect between the knuckle and the vehicle frame.

9. The swing arm suspension of claim 5, wherein the pivot joint of the swing arm comprises a cross-shaft joint for connecting the front end of the swing arm to the vehicle frame, the cross shaft joint allowing full pivoting about a substantially horizontal, transversely extending axis and separately allowing full pivoting about a substantially vertical axis, while substantially resisting rotation of the swing arm about a swing arm longitudinal axis which could otherwise result in camber change.

10. The swing arm suspension of claim 8, wherein the rear end of the swing arm is formed by bent plate or sheet metal.

11. A swing arm suspension for a rear wheel on an offroad vehicle, comprising:
   a knuckle for supporting a rotational hub of a rear wheel, orientation of the knuckle controlling camber and toe-in of the rear wheel;
   a swing arm extending generally longitudinally on the vehicle, supporting the knuckle at its rear end and secured to a vehicle frame at its front end by a pivot joint permitting suspension travel of the knuckle;
   a shock absorber connected between a rear portion of the swing arm and the vehicle frame, for dampening suspension motion; and
   a plurality of tie rods connected between the vehicle frame and the knuckle, at least one of the tie rods being connected to the knuckle at a location significantly in front of a rotational axis of the rear wheel, at least one of the tie rods being connected to the knuckle at a location significantly behind the rotational axis of the rear wheel, so the tie rods control toe-in of the rear wheel in a manner that toe-in changes as a function of suspension position, wherein half track width changes <3% from a steady state position to any compressed position, and changes >3% from a steady state position to a fully extended position.

12. The swing arm suspension of claim 11, wherein the rear end of the swing arm is formed by bent plate or sheet metal.

13. A swing arm suspension for a rear wheel of an off road vehicle, comprising:
   a knuckle for supporting a rotational hub of a rear wheel, orientation of the knuckle controlling camber and toe-in of the rear wheel;
   a swing arm extending generally longitudinally on the vehicle, supporting the knuckle at its rear end and secured to a vehicle frame at its front end by a pivot joint permitting suspension travel of the knuckle;
   a shock absorber connected between a rear portion of the swing arm and the vehicle frame, for dampening suspension motion; and
   a plurality of tie rods connected between the vehicle frame and the knuckle, at least one of the tie rods being connected to the knuckle at a location significantly in front of a rotational axis of the rear wheel, at least one of the tie rods being connected to the knuckle at a location significantly behind the rotational axis of the rear wheel, so the tie rods control toe-in of the rear wheel in a manner that toe-in changes as a function of suspension position, wherein toe-in remains plus or minus about 1° or less from a steady state position to any extended position, but a heavily loaded position increases toe-in greater than 2°.

14. The swing arm suspension of claim 13, wherein the rear end of the swing arm is formed by bent plate or sheet metal.

15. A swing arm suspension for a rear wheel of an off road vehicle, comprising:
   a knuckle for supporting a rotational hub of a rear wheel, orientation of the knuckle controlling camber and toe-in of the rear wheel;
   a swing arm extending generally longitudinally on the vehicle, supporting the knuckle at its rear end and secured to a vehicle frame at its front end by a cross shaft joint permitting suspension travel of the knuckle, the cross-shaft joint allowing full pivoting about a substantially horizontal, transversely extending axis and separately allowing full pivoting about a substantially vertical axis, while significantly resisting rotation of the swing arm about a swing arm longitudinal axis;
   a shock absorber connected between a rear portion of the swing arm and the vehicle frame, for dampening suspension motion; and
   a plurality of tie rods connected between the vehicle frame and the knuckle.

16. The swing arm suspension of claim 15 on an offroad vehicle, wherein half track width changes <3% from a steady state position to any compressed position, and changes >3% from a steady state position to a fully extended position.

17. The swing arm suspension of claim 16, wherein camber changes <2° between any two suspension positions.

18. The swing arm suspension of claim 15, wherein the rear end of the swing arm comprises an upper clamping arm spaced from a lower clamping arm, the knuckle connected to the upper clamping arm by a first joint bearing, the knuckle connected to the lower clamping arm by a second joint bearing.

19. The swing arm suspension of claim 18, wherein the upper clamping arm and lower clamping arm are joined by a connection rod to form an eye, and wherein at least one of the tie rods extends through the eye.

20. The swing arm suspension of claim 18, wherein the shock absorber connects to the swing arm immediately adjacent and in front of the upper clamping arm.

* * * * *